(12) United States Patent
Guo et al.

(10) Patent No.: US 12,393,319 B2
(45) Date of Patent: Aug. 19, 2025

(54) DISPLAY METHOD, NON-TRANSITORY READABLE STORAGE MEDIUM, AND CHIP

(71) Applicant: VIVO MOBILE COMMUNICATION CO., LTD., Dongguan (CN)

(72) Inventors: Jinliang Guo, Dongguan (CN); Yuan Lei, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/807,388

(22) Filed: Aug. 16, 2024

(65) Prior Publication Data

US 2024/0402884 A1 Dec. 5, 2024

Related U.S. Application Data

(63) Continuation of application No. PCT/CN2023/076245, filed on Feb. 15, 2023.

(30) Foreign Application Priority Data

Feb. 18, 2022 (CN) .......................... 202210153566.2

(51) Int. Cl.
*G06F 3/0482* (2013.01)
*G06F 3/0484* (2022.01)
*G06F 3/14* (2006.01)

(52) U.S. Cl.
CPC .......... *G06F 3/0482* (2013.01); *G06F 3/0484* (2013.01); *G06F 3/14* (2013.01); *G06F 2203/04803* (2013.01)

(58) Field of Classification Search
CPC .... G06F 3/048; G06F 3/04817; G06F 3/0482; G06F 3/04842; G06F 3/04847–0485
See application file for complete search history.

(56) References Cited

U.S. PATENT DOCUMENTS

| | | | | |
|---|---|---|---|---|
| 9,030,418 B2* | 5/2015 | Ku | .......... | G06F 3/0444 345/173 |
| 9,678,582 B2* | 6/2017 | Kwak | .......... | G09G 3/035 |
| 11,048,379 B2* | 6/2021 | Cheong | .......... | G06F 3/0488 |
| 11,138,912 B2* | 10/2021 | Klein | .......... | G06F 9/445 |
| 11,467,715 B2* | 10/2022 | Wang | .......... | G06F 1/1641 |
| 11,579,753 B2* | 2/2023 | Lee | .......... | G06F 1/1652 |
| 2009/0315848 A1* | 12/2009 | Ku | .......... | G06F 3/044 715/810 |
| 2010/0141605 A1* | 6/2010 | Kang | .......... | G06F 1/1643 345/174 |

(Continued)

FOREIGN PATENT DOCUMENTS

| CN | 106060631 A | 10/2016 |
|---|---|---|
| CN | 107678661 A | 2/2018 |

(Continued)

*Primary Examiner* — Patrick F Marinelli
(74) *Attorney, Agent, or Firm* — The Webb Law Firm (57) ABSTRACT

A display method includes displaying a first interface in full screen on the foldable screen in an unfolded state; receiving a first input performed by a user; and displaying the first interface in a first region of the foldable screen, and displaying at least one floating control in a second region of the foldable screen in response to the first input, and each floating control is used for displaying a second interface associated with the first interface.

12 Claims, 3 Drawing Sheets

(56) References Cited

U.S. PATENT DOCUMENTS

| | | | |
|---|---|---|---|
| 2010/0182265 A1* | 7/2010 | Kim | G06F 1/1641 345/1.3 |
| 2011/0107272 A1* | 5/2011 | Aguilar | G06F 3/04883 345/173 |
| 2012/0105363 A1* | 5/2012 | Sirpal | G06F 1/1649 345/173 |
| 2012/0115422 A1* | 5/2012 | Tziortzis | G06F 1/1652 455/73 |
| 2013/0093669 A1* | 4/2013 | Park | G06F 1/1677 345/156 |
| 2013/0104051 A1 | 4/2013 | Reeves et al. | |
| 2013/0176248 A1* | 7/2013 | Shin | G06F 3/041 345/173 |
| 2013/0215088 A1* | 8/2013 | Son | G06F 3/04897 345/204 |
| 2013/0296000 A1* | 11/2013 | Park | G06F 3/017 455/566 |
| 2014/0028596 A1* | 1/2014 | Seo | G06F 3/0487 345/173 |
| 2014/0049464 A1* | 2/2014 | Kwak | G06F 3/017 345/156 |
| 2014/0055429 A1* | 2/2014 | Kwon | G06F 1/1652 345/204 |
| 2014/0164991 A1* | 6/2014 | Kim | G06F 3/0486 715/788 |
| 2014/0351722 A1* | 11/2014 | Frederickson | G06F 3/0481 715/761 |
| 2014/0351748 A1* | 11/2014 | Xia | G06F 3/04847 715/798 |
| 2015/0185968 A1* | 7/2015 | Kim | G06F 3/0487 715/788 |
| 2015/0227173 A1* | 8/2015 | Hwang | G06F 1/1652 345/619 |
| 2015/0331496 A1* | 11/2015 | Kwak | G09G 3/035 345/156 |
| 2015/0348453 A1* | 12/2015 | Jin | G09F 9/301 345/173 |
| 2015/0355728 A1* | 12/2015 | Cho | G06F 3/03 345/173 |
| 2015/0378557 A1* | 12/2015 | Jeong | G06F 1/1652 715/835 |
| 2016/0026381 A1* | 1/2016 | Kim | G06F 3/04817 715/761 |
| 2016/0307545 A1* | 10/2016 | Lee | G09G 5/346 |
| 2018/0039387 A1* | 2/2018 | Cheong | G06F 1/1652 |
| 2018/0103132 A1* | 4/2018 | Prushinskiy | G06F 1/16 |
| 2020/0249771 A1* | 8/2020 | Kim | G04G 9/007 |
| 2021/0342045 A1* | 11/2021 | Wang | G06F 1/1641 |
| 2022/0035494 A1* | 2/2022 | Lee | G06F 1/1616 |
| 2022/0300154 A1 | 9/2022 | Li | |
| 2023/0319565 A1* | 10/2023 | Seo | G06F 3/0486 455/411 |
| 2024/0402884 A1* | 12/2024 | Guo | G06F 1/1652 |
| 2024/0403380 A1* | 12/2024 | Tang | G06F 9/451 |

FOREIGN PATENT DOCUMENTS

| | | |
|---|---|---|
| CN | 107688370 A | 2/2018 |
| CN | 109710132 A | 5/2019 |
| CN | 111124225 A | 5/2020 |
| CN | 111666023 A | 9/2020 |
| CN | 111949345 A | 11/2020 |
| CN | 112130728 A | 12/2020 |
| CN | 114578898 A | 6/2022 |
| WO | 2010028399 A1 | 3/2010 |
| WO | 2020147666 A1 | 7/2020 |
| WO | 2020213978 A1 | 10/2020 |
| WO | 2021103981 A1 | 6/2021 |
| WO | 2021244443 A1 | 12/2021 |

\* cited by examiner

DISPLAY METHOD, NON-TRANSITORY READABLE STORAGE MEDIUM, AND CHIP

CROSS-REFERENCE TO RELATED APPLICATIONS

This application is a Bypass Continuation Application of International Patent Application No. PCT/CN2023/076245 filed Feb. 15, 2023, and claims priority to Chinese Patent Application No. 202210153566.2 filed Feb. 18, 2022, the disclosures of which are hereby incorporated by reference in their entireties.

BACKGROUND OF THE INVENTION

Field of the Invention

This application relates to the field of communication technologies, and in particular, to a display method, a non-transitory readable storage medium and a chip.

Description of Related Art

With the continuous development of screen technologies, flexible screens have been widely applied in electronic devices, bringing entirely new operation and use experience for users. For example, the electronic device may unfold a foldable screen, and display an interface in an unfolded region of the foldable screen.

At present, when the foldable screen of the electronic device is in an unfolded state, the electronic device can display one interface in full screen, or can respectively display two different interfaces in two screen regions of the foldable screen, which is convenient for the user to use.

However, based on the foregoing method, since the electronic device displays one interface in full screen or respectively displays two interfaces in the two screen regions of the foldable screen, an advantage of the foldable screen cannot be fully used to display the interface, resulting in a single way of displaying the interface on the electronic device.

SUMMARY OF THE INVENTION

According to a first aspect, an embodiment of this application provides a display method, applied to an electronic device. The electronic device includes a foldable screen. The method includes: displaying a first interface in full screen on the foldable screen in an unfolded state; receiving a first input performed by a user; and displaying the first interface in a first region of the foldable screen, and displaying at least one floating control in a second region of the foldable screen in response to the first input, where each floating control is used for displaying a second interface associated with the first interface.

According to a second aspect, an embodiment of this application provides an electronic device, including a foldable screen. The electronic device includes a display module and a receiving module. The display module is configured to display a first interface in full screen on the foldable screen in an unfolded state; the receiving module is configured to receive a first input performed by a user; and the display module is further configured to: display the first interface in a first region of the foldable screen, and display at least one floating control in a second region of the foldable screen in response to the first input received by the receiving module, where each floating control is used for displaying a second interface associated with the first interface.

According to a third aspect, an embodiment of this application provides a non-transitory readable storage medium, storing a program or instructions. When the program or the instructions are executed by a processor, steps of the method according to the first aspect are implemented.

According to a fourth aspect, an embodiment of this application provides a chip, including a processor and a communication interface. The communication interface is coupled to the processor, and the processor is configured to run a program or instructions, to implement the method according to the first aspect.

According to a fifth aspect, an embodiment of this application provides a computer program product. The computer program product is stored in a non-transitory storage medium and executed by at least one processor to implement the method according to the first aspect.

DESCRIPTION OF THE INVENTION

The following clearly describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application shall fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. Objects distinguished by "first", "second", and the like are usually one type, and the number of objects is not limited. For example, the first object may be one or more than one. In addition, in the specification and the claims, "and/or" represents at least one of the connected objects, and the character "/" generally represents an "or" relationship between the associated objects.

A display method, an electronic device, and a non-transitory readable storage medium provided in the embodiments of this application are described below through embodiments and application scenarios thereof with reference to the accompanying drawings.

Currently, a foldable screen is a featured product launched by manufacturers, and more and more users are starting to use a foldable screen phone. Since a screen of the foldable screen has a special property of being able to be unfolded and folded, it is possible to bring a user a brand new operation and use experience. When the screen of the foldable screen is in an unfolded state, the electronic device may display one interface in full screen for the user to operate or use. However, in this case, since a screen of the electronic device is large, the user can only operate with one hand, so that operation efficiency of the user is low. Alternatively, the electronic device may respectively display one interface on two screen regions of the foldable screen. Although the method improves display efficiency of the electronic device by using a limited screen region to a certain extent, characteristics of the foldable screen are not fully used, and a display mode is simple. For a user who needs to read and browse a large amount of text information, there is a certain shortcoming in operation and efficiency.

To resolve the foregoing problem, in the embodiments of this application, a first interface may be displayed in full screen on a foldable screen in an unfolded state; a first input performed by a user is received; and the first interface is displayed in a first region of the foldable screen, and at least one floating control is displayed in a second region of the foldable screen in response to the first input, where each floating control is used for displaying a second interface associated with the first interface. According to this solution, since an electronic device with a foldable screen may display a first interface displayed in full screen on the foldable screen in an unfolded state in a first region of the foldable screen through an input performed by a user, and display at least one floating control in a second region of the foldable screen. However, each floating control may be used for displaying a second interface associated with the first interface, that is, the electronic device may display, through the at least one floating control, at least one second interface associated with the first interface. Therefore, the way the electronic device displays the interface can be enriched.

Figure 1:
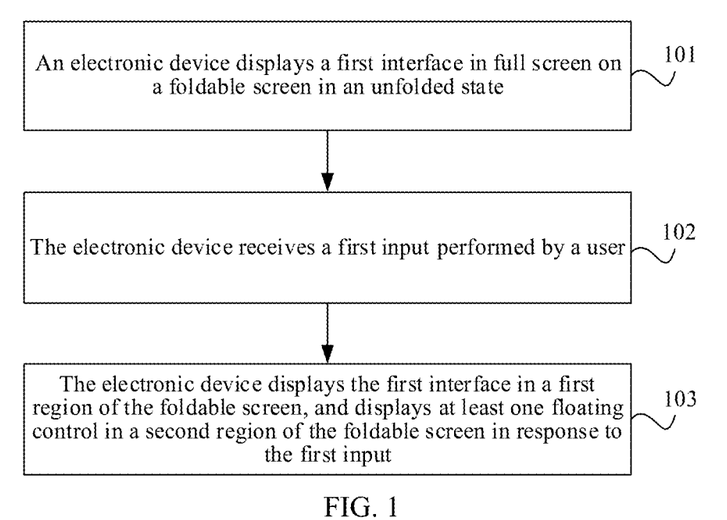
FIG. 1 is a flowchart of a display method according to an embodiment of this application.

With reference to FIG. 1, an embodiment of this application provides a display method, and the method may include the following step 101 to step 103. A description is made below by using an example in which an electronic device with a foldable screen performs the method.

Step 101: An electronic device displays a first interface in full screen on a foldable screen in an unfolded state.

Optionally, in the embodiments of this application, the foldable screen in the unfolded state may be: an angle between two screen regions of the foldable screen is greater than or equal to a preset angle.

Optionally, in the embodiments of this application, the preset angle may be set by system default, or may be set by the user based on an actual use requirement.

Optionally, in the embodiments of this application, that an electronic device displays a first interface in full screen may be: The electronic device displays the first interface on the foregoing two screen regions.

It may be understood that, when the angle between the two screen regions is greater than or equal to the preset angle, the user may easily view or use the first interface.

Step 102: The electronic device receives a first input performed by a user.

Optionally, in the embodiments of this application, the first input may be any possible input such as a touch-control input, a floating input, a physical key input, or a voice input.

For example, the first input is the touch-control input. The first input may be a long press input, a double click input, a slide input, or the like of the user on the foldable screen.

Step 103: The electronic device displays the first interface in a first region of the foldable screen, and displays at least one floating control in a second region of the foldable screen in response to the first input.

In the embodiments of this application, each floating control may be used for displaying a second interface associated with the first interface.

Optionally, in this embodiment of this application, a first region and a second region may be the foregoing two screen regions.

It may be understood that, after receiving the first input, the electronic device may display the first interface displayed in full screen on the foldable screen in the unfolded state in the first region, and display the foregoing at least one floating control in the second region. Since each floating control may be used for displaying the second interface associated with the first interface, the electronic device may display more interfaces through the at least one floating control by fully using the characteristics of the foldable screen, thereby enriching the way the electronic device displays the interface and improving user experience.

Optionally, in this embodiment of this application, after receiving the first input, the electronic device may display a prompt message to prompt the user whether to enable a floating control mode. After receiving a confirmation operation of the user, the electronic device displays the first interface in the first region, and displays the foregoing at least one floating control in the second region.

The description of the second interface associated with the first interface is described in detail in the following embodiments. To avoid repetition, details are not described herein again.

Optionally, in this embodiment of this application, the first interface may be a contact list interface (a possible implementation), or the first interface may be one interface in a plurality of continuous interfaces (another possible implementation).

In a possible implementation, optionally, in this embodiment of this application, the first interface is the contact list interface, and each second interface may be a session interface associated with a contact identifier in the contact list interface.

Optionally, in this embodiment of this application, the contact list interface may be any interface that includes at least one contact identifier. For example, the contact list interface may be an address book interface in a chat application, or may be a contact session list interface in a chat application.

Optionally, in this embodiment of this application, each contact identifier may indicate a contact and may associate a session interface corresponding to the contact.

Optionally, in this embodiment of this application, the contact identifier may be any possible identifier such as a contact name or a contact image.

Optionally, in this embodiment of this application, the first input may include a first sub-input and a second sub-input. The foregoing step 103 may be implemented through the following step 103*a* and step 103*b*.

Step 103*a*: The electronic device displays a contact list interface in the first region in response to a first sub-input.

Optionally, in the embodiments of this application, the first sub-input may be any possible input such as a touch-control input, a floating input, a physical key input, or a voice input.

Step 103*b*: The electronic device displays at least one floating control in a second region in response to a second sub-input of at least one contact identifier in the contact list interface.

In the embodiments of this application, each floating control may display a session interface associated with one contact identifier in the foregoing at least one contact identifier.

Optionally, in this embodiment of this application, the second sub-input may be any possible input such as a touch-control input, a floating input, or a voice input.

Optionally, in this embodiment of this application, after receiving the second sub-input of P contact identifiers in the foregoing contact list interface from the user, the electronic device may display P floating controls respectively corresponding to the P contact identifiers in the second region. P is a positive integer, and each floating control may display a session interface associated with one contact identifier in the P contact identifiers. Therefore, the user may communicate with a contact corresponding to the session interface through the session interface displayed in one of the floating controls.

For example, the user may communicate with P contacts corresponding to P session interfaces through the P session interfaces displayed in the foregoing P floating controls to improve communication efficiency.

It may be understood that, when the user operates a session interface, the electronic device always displays the foregoing contact list interface in the first region to help the user view the contact list interface in real time.

Optionally, in this embodiment of this application, after the electronic device displays the foregoing at least one floating control in the second region, if a target session interface is displayed in one of the floating controls, the electronic device may display the foregoing contact list interface in the floating control through an input performed by the user for the floating control, and display the target session interface in the first region, to help the user amplify viewing/use of the session interface in any one of the floating controls.

In this embodiment of this application, since the electronic device may display the contact list interface in the first region through the input performed by the user, and display a same number of floating controls as contact identifiers selected by the user in the second region based on a selection of contact identifiers in the contact list interface performed by the user, the electronic device may display the session interface associated with a corresponding contact identifier through the floating controls in the second region, so that the flexibility of the electronic device to display the interface may be improved to facilitate user communication.

The following exemplarily describes the display method provided in this embodiment of this application with reference to the accompanying drawings.

Figure 2A:
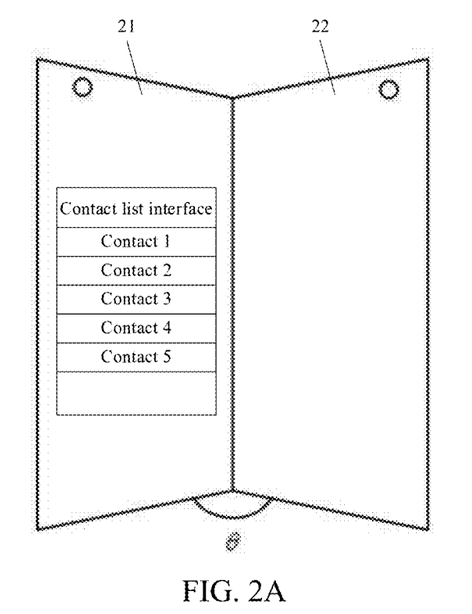
FIG. 2A is a schematic diagram 1 of a display method according to an embodiment of this application.
Figure 2B:
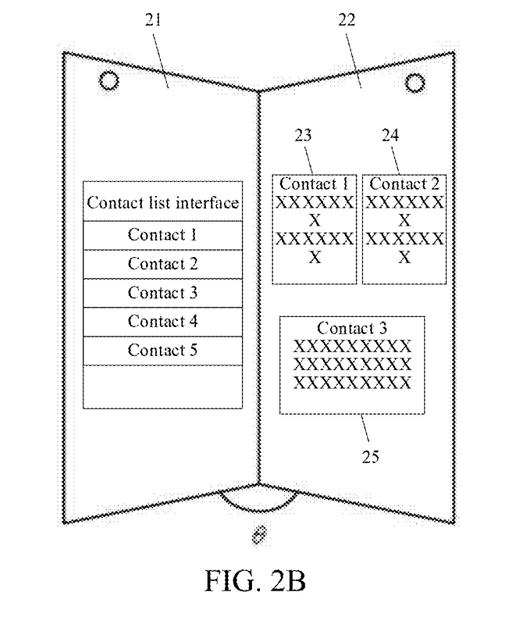
FIG. 2B is a schematic diagram 2 of a display method according to an embodiment of this application.

For example, as shown in FIG. 2A, the first region of the foldable screen in the unfolded state is a region 21, the second region is a region 22, an angle θ between the region 21 and the region 22 is greater than or equal to the foregoing preset angle, and the first interface is the contact list interface. If the electronic device receives a first sub-input performed by the user, the electronic device may display the contact list interface in the region 21. If the electronic device receives second sub-inputs of the user for a contact 1, a contact 2, and a contact 3 (that is, at least one contact identifier) in the contact list interface, as shown in FIG. 2B, the electronic device may display a floating control 23, a floating control 24, and a floating control 25 (that is, at least one floating control) in the region 22. In addition, the floating control 23 may be used for displaying a session interface associated with the contact 1, the floating control 24 may be used for displaying a session interface associated with the contact 2, and the floating control 25 may be used for displaying a session interface associated with the contact 3. In this way, the flexibility of the electronic device to display the interface may be improved to facilitate user communication.

In this embodiment of this application, since the first interface may be the contact list interface, and each second interface may be the session interface associated with the contact identifier in the contact list interface, the electronic device may display the contact list interface in the first region, and display a session interface associated with a contact identifier in each floating control displayed in the second region, to improve communication efficiency of the user.

In another possible implementation, optionally, in this embodiment of this application, the first interface is one interface in a plurality of continuous interfaces, M second interfaces in the plurality of interfaces may be displayed in M floating controls in the at least one floating control, the first interface and the M second interfaces are continuous (M+1) interfaces in the plurality of interfaces, and M is a positive integer.

Optionally, in this embodiment of this application, the plurality of continuous interfaces may be any possible plurality of interfaces such as a plurality of continuous text reading interfaces, a plurality of continuous picture browsing interfaces, or a plurality of continuous teletext interfaces.

Optionally, in this embodiment of this application, the (M+1) interfaces may be at least some interfaces in the plurality of interfaces.

For example, if the plurality of interfaces is Q+1 interfaces, M is a positive integer less than or equal to Q.

Optionally, in this embodiment of this application, the M second interfaces are M continuous interfaces in the plurality of interfaces, and the M second interfaces may be M interfaces before/after the first interface and continuous with the first interface.

Optionally, in this embodiment of this application, M may be determined by the electronic device based on a number of the plurality of interfaces.

Optionally, in this embodiment of this application, a number of the at least one floating control may be set by system default, or may be set by the user based on an actual use requirement.

It may be understood that, if the number of the plurality of interfaces is greater than the number of the at least one floating control, a second interface may be displayed in each floating control in the at least one floating control; or if the number of the plurality of interfaces is less than or equal to the number of the at least one floating control, the second interface may be displayed in some floating controls in the at least one floating control.

Optionally, in this embodiment of this application, after step 103, the display method provided in this embodiment of this application may further include the following step 104 and step 105.

Step 104: The electronic device receives a second input performed by the user for a first floating control in the at least one floating control.

In this embodiment of this application, a third interface may be displayed in the first floating control.

Optionally, in this embodiment of this application, the third interface may be one interface in the M second interfaces.

Optionally, in this embodiment of this application, the second input may be any possible input such as a touch-control input, a floating input, or a voice input.

Step 105: The electronic device displays a third interface in the first region, and displays N fourth interfaces in a plurality of interfaces in N floating controls in the at least one floating control in response to the second input.

In this embodiment of this application, the third interface and the N fourth interfaces are (N+1) continuous interfaces in the plurality of interfaces, and N is an integer greater than or equal to 0.

Optionally, in this embodiment of this application, the (N+1) interfaces may be some interfaces in the plurality of interfaces.

Optionally, in this embodiment of this application, the N fourth interfaces are N continuous interfaces in the plurality of interfaces, and the N fourth interfaces may be N interfaces before/after the third interface and continuous with the third interface.

Optionally, in this embodiment of this application, N may be determined by the electronic device based on the number of the plurality of interfaces.

It should be noted that, during actual implementation, the at least one floating control may include a floating control that does not display an interface, and if the electronic device receives a second input performed by the user for a floating control that does not display an interface, the electronic device may not display the interface in the first region, nor display the interface in the at least one floating control.

In this embodiment of this application, since the electronic device may display the third interface in the first region through an input performed by the user for a floating control displaying the third interface in the at least one floating control, and update the interface displayed in the at least one floating control based on the plurality of continuous interfaces, the flexibility of the electronic device to display the interface may be improved to help the user browse the plurality of interfaces.

The following exemplarily describes the display method provided in this embodiment of this application with reference to the accompanying drawings.

Figure 3A:
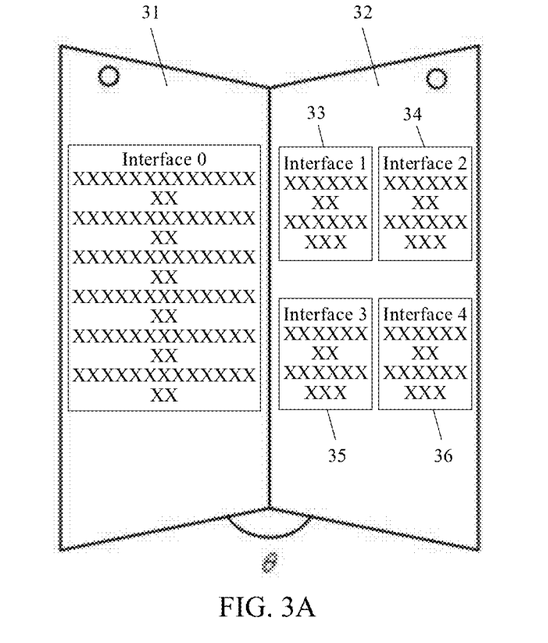
FIG. 3A is a schematic diagram 3 of a display method according to an embodiment of this application.

For example, as shown in FIG. 3A, the first region of the foldable screen in the unfolded state is a region 31, the second region is a region 32, an angle θ between the region 31 and the region 32 is greater than or equal to the foregoing preset angle, and the first interface is an interface 0 in the plurality of continuous interfaces. After receiving the first input performed by the user, the electronic device may display the interface 0 in the region 31, and display a floating control 33, a floating control 34, a floating control 35, and a floating control 36 (that is, at least one floating control) in the region 32. Assuming that an interface 1, an interface 2, an interface 3, and an interface 4 (that is, M second interfaces) are interfaces in the plurality of interfaces and that are located after the interface 0 and continuous with the interface 0, the floating control 33 may be used for displaying the interface 1, the floating control 34 may be used for displaying the interface 2, the floating control 35 may be used for displaying the interface 3, and the floating control 36 may be used for displaying the interface 4.

Figure 3B:
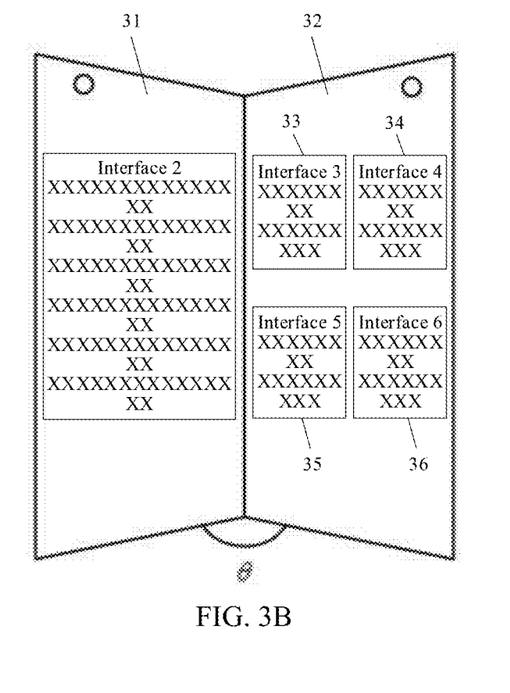
FIG. 3B is a schematic diagram 4 of a display method according to an embodiment of this application.

For example, assuming that the interface 3, the interface 4, an interface 5, and an interface 6 (that is, N fourth interfaces) are interfaces in the plurality of interfaces and that are located after the interface 2 and continuous with the interface 2 (that is, a third interface). After the electronic device receives the input (that is, the second input) of the user for the floating control 34 (that is, the first floating control), as shown in FIG. 3B, the electronic device may display the interface 2 in the region 31, the interface 3 in the floating control 33, the interface 4 in the floating control 34, the interface 5 in the floating control 35, and the interface 6 in the floating control 36. This can improve the flexibility of the electronic device to display the interface to help the user browse the foregoing plurality of interfaces.

In the embodiments of this application, since the first interface may be one interface in the plurality of continuous interfaces, and M second interfaces in the plurality of interfaces and that are continuous with the first interface may be displayed in the M floating controls in the floating controls displayed in the second region, the electronic device may simultaneously display (M+1) continuous interfaces in the plurality of interfaces to improve browsing efficiency of the user.

According to the display method provided in this embodiment of this application, since the electronic device with the foldable screen may display the first interface displayed in full screen on the foldable screen in the unfolded state in the first region of the foldable screen through an input performed by the user, and display at least one floating control in the second region of the foldable screen. However, each floating control may be used for displaying a second interface associated with the first interface, that is, the electronic device may display at least one second interface associated with the first interface through the at least one floating control. Therefore, the way the electronic device displays the interface can be enriched.

Optionally, in this embodiment of this application, after step 103, the display method provided in this embodiment of this application may further include the following step 106 and step 107.

Step 106: The electronic device receives a third input performed by the user for a second floating control in the at least one floating control.

Optionally, in this embodiment of this application, the third input may be any possible input such as a touch-control input, a floating input, or a voice input.

Step 107: The electronic device adjusts a display parameter of the second floating control in response to the third input.

Optionally, in this embodiment of this application, the display parameter may include at least one of the following: display position information, display size information, background picture information, or font style information.

Optionally, in this embodiment of this application, the display position information of the second floating control may indicate any position in the second region; the display size information of the second floating control may indicate a display size of the second floating control, and the display size information of the second floating control is less than or equal to size information of the second region; the background picture information of the second floating control may indicate a background picture displayed in the second floating control; and the font style information of the second floating control may indicate a font style of a content of the second interface displayed in the second floating control.

Optionally, in this embodiment of this application, the display parameter may be preset by a system, or may be randomly set by the user.

Optionally, in this embodiment of this application, the electronic device may adjust display parameters of at least some floating controls through an input performed by the user for the at least some floating controls in the at least one floating control, so that at least one floating control displayed in the second region meets a use requirement of the user, thereby improving the user experience.

It should be noted that, during actual implementation, the display parameter is not limited, that is, the electronic device may adjust any possible display parameter of the floating control through an input performed by the user for the floating control.

In this embodiment of this application, since the electronic device may adjust at least one of display position information, display size information, background picture information, or font style information of one floating control displayed in the second region through the input performed by the user for the floating control, the way the electronic device displays the interface may be enriched.

Figure 4:
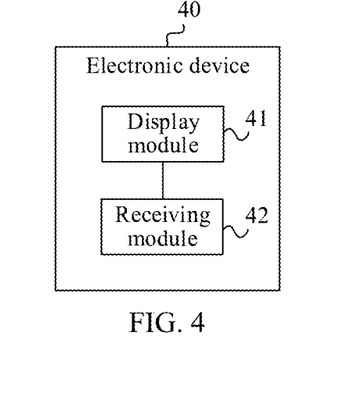
FIG. 4 is a schematic diagram of an electronic device according to an embodiment of this application.

With reference to FIG. 4, an embodiment of this application provides an electronic device 40, including a foldable screen. The electronic device 40 may include a display module 41 and a receiving module 42. The display module 41 may be configured to display a first interface in full screen on the foldable screen in an unfolded state. The receiving module 42 may be configured to receive a first input performed by a user. The display module 41 may be further configured to: display the first interface in a first region of the foldable screen, and display at least one floating control in a second region of the foldable screen in response to the first input received by the receiving module 42, where each floating control is used for displaying a second interface associated with the first interface.

In a possible implementation, the first interface may be a contact list interface, and each second interface may be a session interface associated with a contact identifier in the contact list interface.

In a possible implementation, the first input may include a first sub-input and a second sub-input. The display module 41 may be further configured to display the contact list interface in the first region in response to the first sub-input received by the receiving module 42. The display module 41 may be further configured to display the at least one floating control in the second region in response to the second sub-input of at least one contact identifier in the contact list interface received by the receiving module 42, where each floating control displays a session interface associated with one contact identifier in the at least one contact identifier.

In a possible implementation, the first interface may be one interface in a plurality of continuous interfaces, where M second interfaces in the plurality of interfaces are displayed in M floating controls in the at least one floating control, the first interface and the M second interfaces are continuous (M+1) interfaces in the plurality of interfaces, and M is a positive integer.

In a possible implementation, the receiving module 42 may be further configured to receive, after the display module 41 displays the at least one floating control in the second region, a second input performed by the user for a first floating control in the at least one floating control, where a third interface is displayed in the first floating control. The display module 41 may be further configured to: display the third interface in the first region, and display N fourth interfaces in the plurality of interfaces in N floating controls in the at least one floating control in response to the second input received by the receiving module 42, where the third interface and the N fourth interfaces are (N+1) continuous interfaces in the plurality of interfaces, and N is an integer greater than or equal to 0.

In a possible implementation, the electronic device 40 may further include an adjustment module. The receiving module 42 may further be configured to receive, after the display module 41 displays the at least one floating control in the second region, a third input performed by the user for a second floating control in the at least one floating control. The adjustment module may be configured to adjust a display parameter of the second floating control in response to the third input received by the receiving module 42, where the display parameter includes at least one of the following: display position information, display size information, background picture information, or font style information.

According to the electronic device provided in this embodiment of this application, since the electronic device may display the first interface displayed in full screen on the foldable screen in the unfolded state in the first region of the foldable screen through an input performed by a user, and display at least one floating control in the second region of the foldable screen. However, each floating control may be used for displaying the second interface associated with the first interface, that is, the display apparatus may display at least one second interface associated with the first interface through the at least one floating control. Therefore, the way the display apparatus displays the interface can be enriched.

For the beneficial effects of various implementations in the embodiments, reference may be made to the beneficial effects of corresponding implementations in the foregoing method embodiment. To avoid repetition, details are not described herein again.

It should be noted that, in the embodiments of this application, the electronic device may be a terminal or may be another device other than a terminal. For example, the electronic device may be a mobile phone, a tablet computer, a laptop computer, a handheld computer, an in-vehicle electronic device, a mobile Internet device (MID), an augmented reality (AR)/virtual reality (VR) device, a robot, a wearable device, an ultra-mobile personal computer (UMPC), a netbook, or a personal digital assistant (PDA), and the electronic device may further be a server, a network attached storage (NAS), a personal computer (PC), a television (TV), a teller machine, or a self-service machine. This is not limited in the embodiments of this application.

An embodiment of this application further provides a non-transitory readable storage medium, storing a program or instructions. When the program or the instructions are executed by a processor, all processes of the foregoing display method embodiments are implemented, and the same technical effects can be achieved. To avoid repetition, details are not described herein again.

The foregoing processor is a processor in the electronic device in the foregoing embodiments. The foregoing non-transitory readable storage medium includes a non-transitory computer-readable storage medium, for example, a computer read-only memory (ROM), a random access memory (RAM), a magnetic disk, or an optical disc.

An embodiment of this application further provides a chip, including a processor and a communication interface, where the communication interface is coupled to the processor, and the processor is configured to run a program or instructions, to implement all processes of the foregoing display method embodiments, and can achieve the same technical effects. To avoid repetition, details are not described herein again.

It should be understood that, the chip mentioned in the embodiments of this application may also be referred to as a system-level chip, a system chip, a chip system, a system on chip, or the like.

It should be noted that, the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that, the scope of the method and apparatus in the embodiments of this application is not limited to performing functions in the order shown or discussed, and it may further include performing the functions in a substantially simultaneous manner or in reverse order according to the functions involved. For example, the described method may be performed in a different order than described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, and certainly, may alternatively be implemented by hardware. Based on such an understanding, the technical solutions in this application essentially or a part that contributes to the conventional technologies may be implemented in the form of a computer software product. The computer software product is stored in a storage medium (for example, a ROM/RAM, a magnetic disk, or an optical disc), and includes several instructions for instructing a terminal (which may be a mobile phone, a computer, a server, a network device, or the like) to perform the method described in the embodiments of this application.

The embodiments of this application are described above with reference to the accompanying drawings, but this application is not limited to the foregoing embodiments, which are merely illustrative rather than limited. Under the inspiration of this application, a person of ordinary skill in the art may make various variations without departing from the scope of this application and the protection of the claims, and such variations shall fall within the protection of this application.

What is claimed is:

1. A display method, applied to an electronic device, the electronic device comprising a foldable screen, the method comprising:
    displaying a first interface in full screen on the foldable screen in an unfolded state;
    receiving a first input performed by a user; and
    displaying the first interface in a first region of the foldable screen, and displaying at least one floating control in a second region of the foldable screen in response to the first input, wherein each floating control is used for displaying a second interface associated with the first interface; wherein
    the first interface is one interface in a plurality of continuous interfaces, wherein
    M second interfaces in the plurality of interfaces are displayed in M floating controls in the at least one floating control, the first interface and the M second interfaces are continuous (M+1) interfaces in the plurality of interfaces, and M is a positive integer; wherein
    after the displaying the at least one floating control in the second region of the foldable screen, the method further comprises:
    receiving a second input performed by the user for a first floating control in the at least one floating control, wherein a third interface is displayed in the first floating control; and
    displaying the third interface in the first region, and displaying N fourth interfaces in the plurality of interfaces in N floating controls in the at least one floating control in response to the second input, wherein
    the third interface and the N fourth interfaces are (N+1) continuous interfaces in the plurality of interfaces, and N is an integer greater than or equal to 0.

2. The method according to claim 1, wherein the first interface is a contact list interface, and each second interface is a session interface associated with a contact identifier in the contact list interface.

3. The method according to claim 2, wherein the first input comprises a first sub-input and a second sub-input; and
    the displaying the first interface in a first region of the foldable screen, and displaying at least one floating control in a second region of the foldable screen in response to the first input comprises:
    displaying the contact list interface in the first region in response to the first sub-input; and
    displaying the at least one floating control in the second region in response to the second sub-input of at least one contact identifier in the contact list interface, wherein
    each floating control displays a session interface associated with one contact identifier in the at least one contact identifier.

4. The method according to claim 1, wherein after the displaying at least one floating control in a second region of the foldable screen, the method further comprises:
    receiving a third input performed by the user for a second floating control in the at least one floating control; and
    adjusting a display parameter of the second floating control in response to the third input, wherein
    the display parameter comprises at least one of the following: display position information, display size information, background picture information, or font style information.

5. A non-transitory readable storage medium, storing a program or instructions, wherein the program or the instructions, when executed by a processor of an electronic device, cause the electronic device to perform:
    displaying a first interface in full screen on a foldable screen in an unfolded state, wherein the electronic device comprises the foldable screen;
    receiving a first input performed by a user; and
    displaying the first interface in a first region of the foldable screen, and displaying at least one floating control in a second region of the foldable screen in response to the first input, wherein each floating control is used for displaying a second interface associated with the first interface; wherein
    the first interface is one interface in a plurality of continuous interfaces, wherein
    M second interfaces in the plurality of interfaces are displayed in M floating controls in the at least one floating control, the first interface and the M second interfaces are continuous (M+1) interfaces in the plurality of interfaces, and M is a positive integer; wherein
    the program or the instructions, when executed by the processor, cause the electronic device to further perform:
    receiving a second input performed by the user for a first floating control in the at least one floating control, wherein a third interface is displayed in the first floating control; and
    displaying the third interface in the first region, and displaying N fourth interfaces in the plurality of interfaces in N floating controls in the at least one floating control in response to the second input, wherein the third interface and the N fourth interfaces are (N+1) continuous interfaces in the plurality of interfaces, and N is an integer greater than or equal to 0.

6. The non-transitory readable storage medium according to claim 5, wherein the first interface is a contact list interface, and each second interface is a session interface associated with a contact identifier in the contact list interface.

7. The non-transitory readable storage medium according to claim 6, wherein the first input comprises a first sub-input and a second sub-input; and
the program or the instructions, when executed by the processor, cause the electronic device to perform:
displaying the contact list interface in the first region in response to the first sub-input; and
displaying the at least one floating control in the second region in response to the second sub-input of at least one contact identifier in the contact list interface, wherein
each floating control displays a session interface associated with one contact identifier in the at least one contact identifier.

8. The non-transitory readable storage medium according to claim 5, wherein the program or the instructions, when executed by the processor, cause the electronic device to further perform:
receiving a third input performed by the user for a second floating control in the at least one floating control; and
adjusting a display parameter of the second floating control in response to the third input, wherein
the display parameter comprises at least one of the following: display position information, display size information, background picture information, or font style information.

9. A chip, comprising a processor and a communication interface, wherein the communication interface is coupled to the processor, and the processor is configured to run a program or instructions, to implement:
displaying a first interface in full screen on a foldable screen in an unfolded state;
receiving a first input performed by a user; and
displaying the first interface in a first region of the foldable screen, and displaying at least one floating control in a second region of the foldable screen in response to the first input, wherein each floating control is used for displaying a second interface associated with the first interface; wherein
the first interface is one interface in a plurality of continuous interfaces, wherein M second interfaces in the plurality of interfaces are displayed in M floating controls in the at least one floating control, the first interface and the M second interfaces are continuous (M+1) interfaces in the plurality of interfaces, and M is a positive integer; wherein
the processor is configured to run a program or instructions, to further implement:
receiving a second input performed by the user for a first floating control in the at least one floating control, wherein a third interface is displayed in the first floating control; and
displaying the third interface in the first region, and displaying N fourth interfaces in the plurality of interfaces in N floating controls in the at least one floating control in response to the second input, wherein
the third interface and the N fourth interfaces are (N+1) continuous interfaces in the plurality of interfaces, and N is an integer greater than or equal to 0.

10. The chip according to claim 9, wherein the first interface is a contact list interface, and each second interface is a session interface associated with a contact identifier in the contact list interface.

11. The chip according to claim 10, wherein the first input comprises a first sub-input and a second sub-input; and
the processor is configured to run a program or instructions, to implement:
displaying the contact list interface in the first region in response to the first sub-input; and
displaying the at least one floating control in the second region in response to the second sub-input of at least one contact identifier in the contact list interface, wherein
each floating control displays a session interface associated with one contact identifier in the at least one contact identifier.

12. The chip according to claim 9, wherein the processor is configured to run a program or instructions, to further implement:
receiving a third input performed by the user for a second floating control in the at least one floating control; and
adjusting a display parameter of the second floating control in response to the third input, wherein
the display parameter comprises at least one of the following: display position information, display size information, background picture information, or font style information.

* * * * *